United States Patent
Jones

(10) Patent No.: US 6,292,213 B1
(45) Date of Patent: Sep. 18, 2001

(54) MICRO VIDEO CAMERA USAGE AND USAGE MONITORING

(76) Inventor: Michael J. Jones, 38-B Carmella Dr., Gansevoort, NY (US) 12831

(*) Notice: Subject to any disclaimer, the term of this patent is extended or adjusted under 35 U.S.C. 154(b) by 0 days.

(21) Appl. No.: 09/133,988

(22) Filed: Aug. 14, 1998

Related U.S. Application Data

(60) Provisional application No. 60/055,745, filed on Aug. 15, 1997, and provisional application No. 60/079,967, filed on Mar. 30, 1997.

(51) Int. Cl.[7] .................................................. H04N 7/18
(52) U.S. Cl. ........................... 348/61; 224/181; 224/930; 235/385; 348/77; 348/143; 348/157; 348/158; 348/159; 348/376; 386/118; 455/90; 455/575; 455/578; 705/28
(58) Field of Search ............................. 348/61, 77, 143, 348/157, 158, 159, 376; 224/181, 930; 235/385; 386/118; 705/28; 455/90, 575, 578; H04N 7/18

(56) References Cited

U.S. PATENT DOCUMENTS

| Re. 33,054 | 9/1989 | Markham | 235/385 |
|---|---|---|---|
| 4,097,893 | 6/1978 | Camras | 348/158 |
| 4,135,241 | 1/1979 | Stanis et al. | 705/28 |
| 4,547,815 | 10/1985 | Kimura | 386/118 |
| 4,605,959 | 8/1986 | Colbaugh | 348/158 |
| 4,701,797 | 10/1987 | Ferreira | 348/724 |
| 4,970,589 | 11/1990 | Hanson et al. | 348/158 |
| 5,189,512 | 2/1993 | Cameron et al. | 348/838 |
| 5,424,556 | 6/1995 | Symosek et al. | 250/559.32 |
| 5,508,737 * | 4/1996 | Lang | 348/159 |
| 5,512,396 | 4/1996 | Hicks | 430/21 |
| 5,583,571 | 12/1996 | Friedland | 348/373 |
| 5,594,498 | 1/1997 | Fraley | 348/158 |
| 5,598,208 * | 1/1997 | McClintock | 348/159 |

OTHER PUBLICATIONS

D.C. Greenwood, ed., "Engineering Data for Product Design," McGraw–Hill Book Co., 1961, p. 323.

* cited by examiner

Primary Examiner—Howard Britton
(74) Attorney, Agent, or Firm—Jonathan A. Bay

(57) ABSTRACT

Micro video cameras are sufficiently portable, miniature and weather-resistant for ands-free use by an athlete or vacationer who wishes to wear it (or attach it to a base support structure about him or herself) and self-record his or her own amusement, whether indoors or outdoors, underwater or otherwise. Disclosed usages include an instance of a skier recording hands-free his or her own skiing activity from his or her own perspective. An alternative disclosed usage includes one or more ski instructors video recording a student while actually giving the lesson. Another disclosed usage includes a theme park configuration. In this last configuration, visitors are given a personal storage medium like a cassette. At most rides or attractions, a micro video camera is available just there for loan to the visitor to get a video record just at that ride or attraction. At the end of the ride or attraction, the visitor takes the storage medium along with him or her to the next ride or attraction, and continually adds to the video record of the rides and attractions. Usage monitoring includes a rental network structure as well as supervision of the rental network for efficient sharing of the rental resource, ie., the micro video cameras, as well as a rental-inventory control, allocation and accounting data handling system. Making these micro video cameras viable for rental provides usage opportunities for customers who would like to use them but haven't spent the money to actually own one.

20 Claims, 8 Drawing Sheets

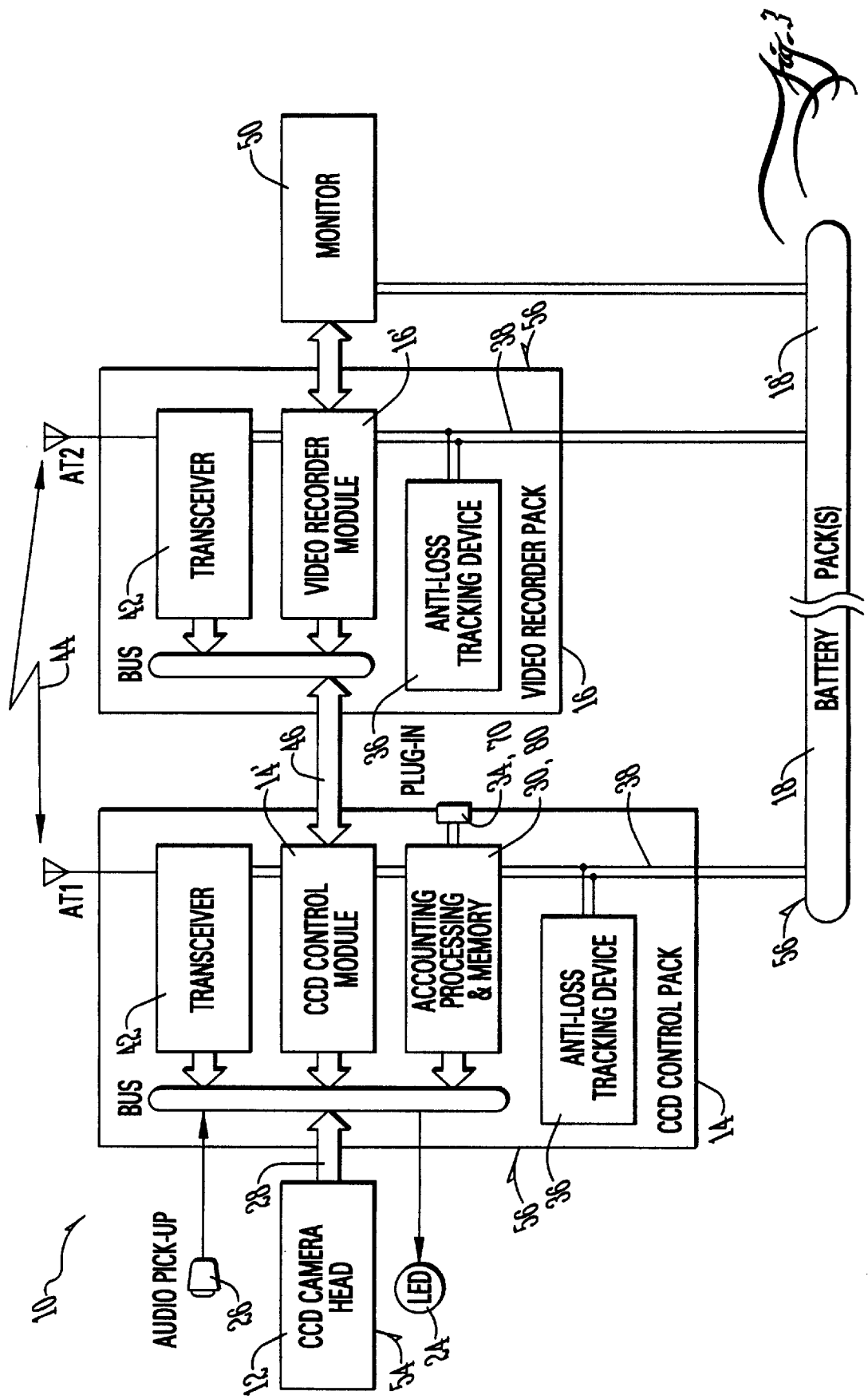

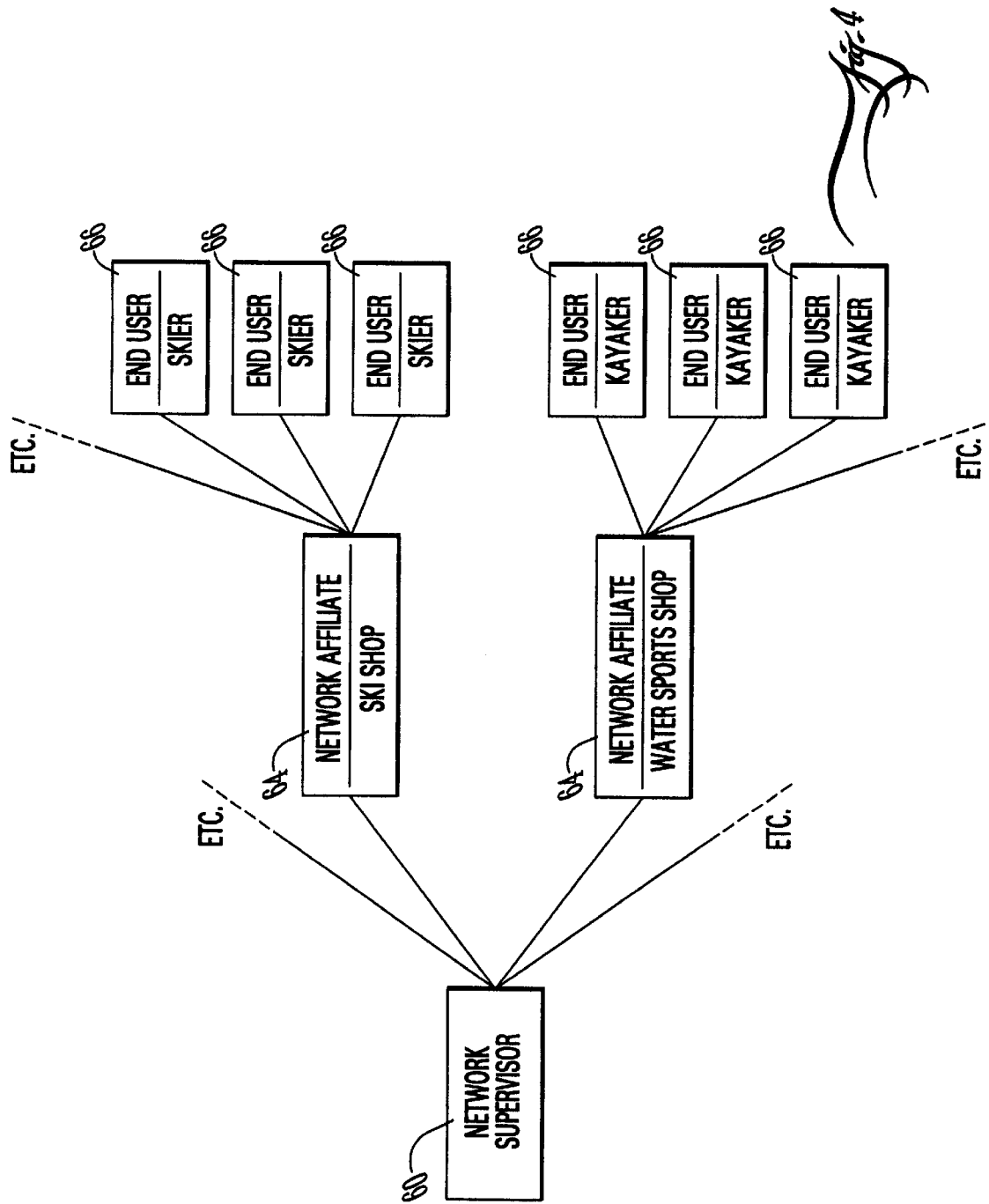

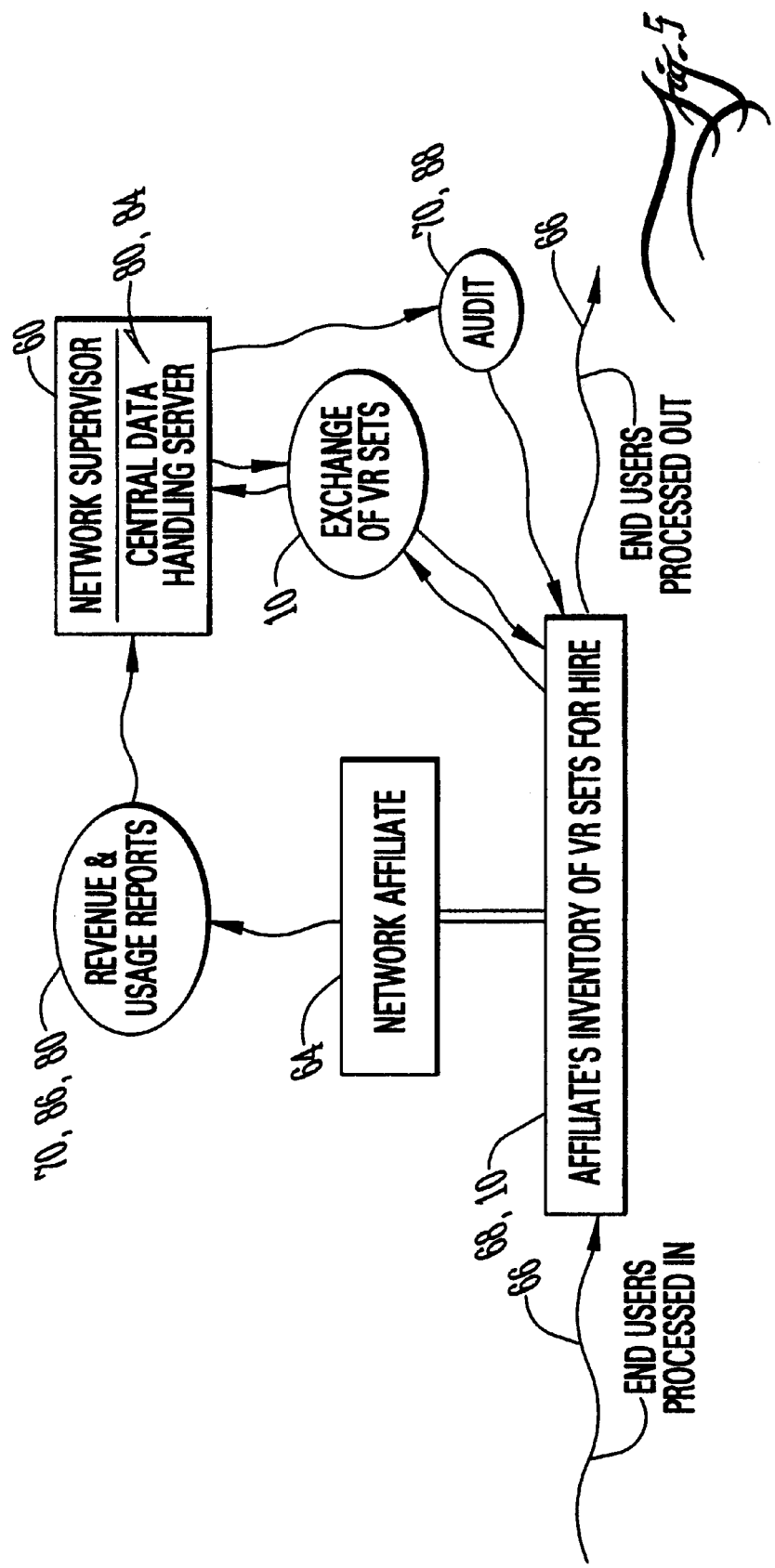

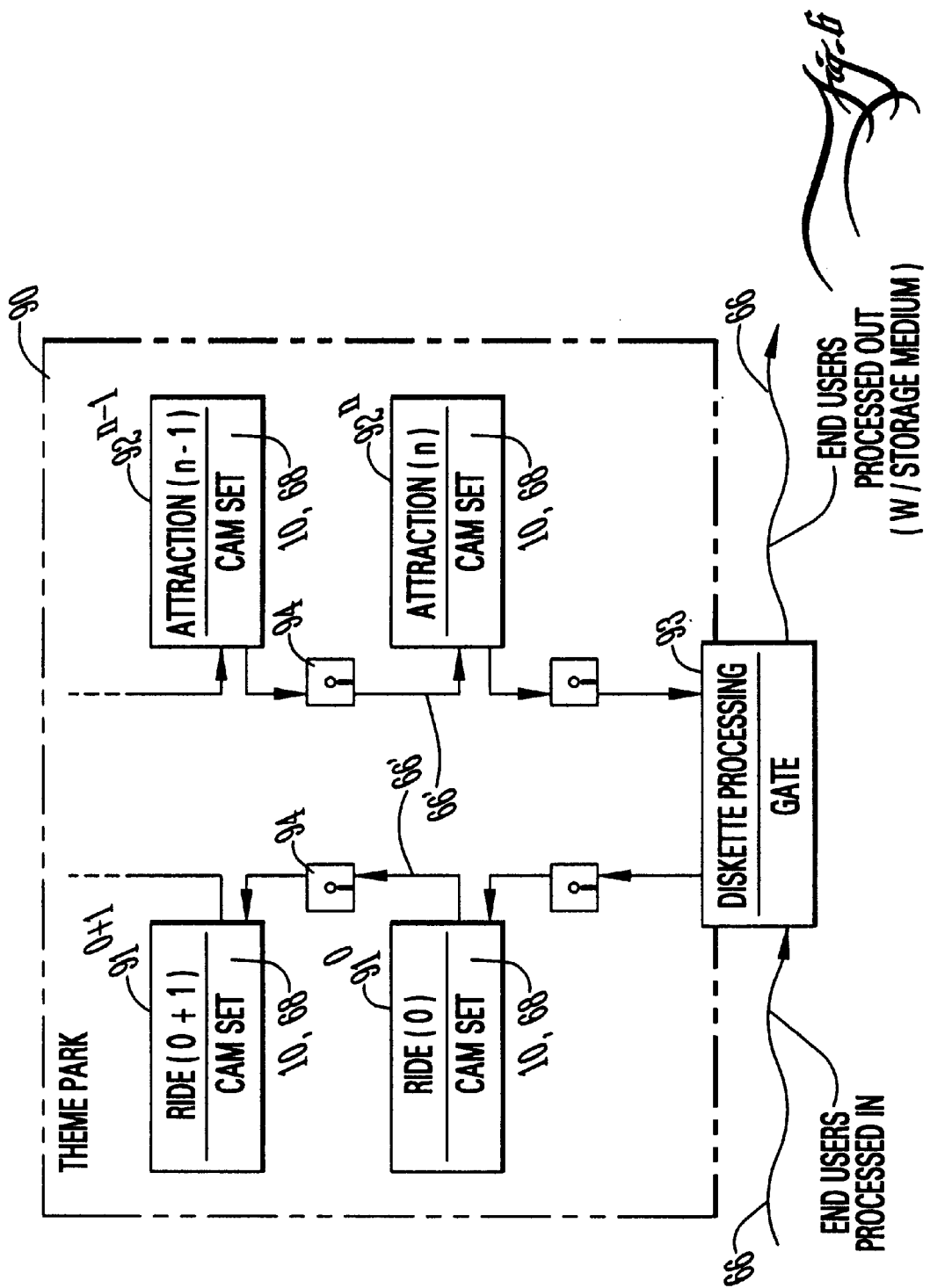

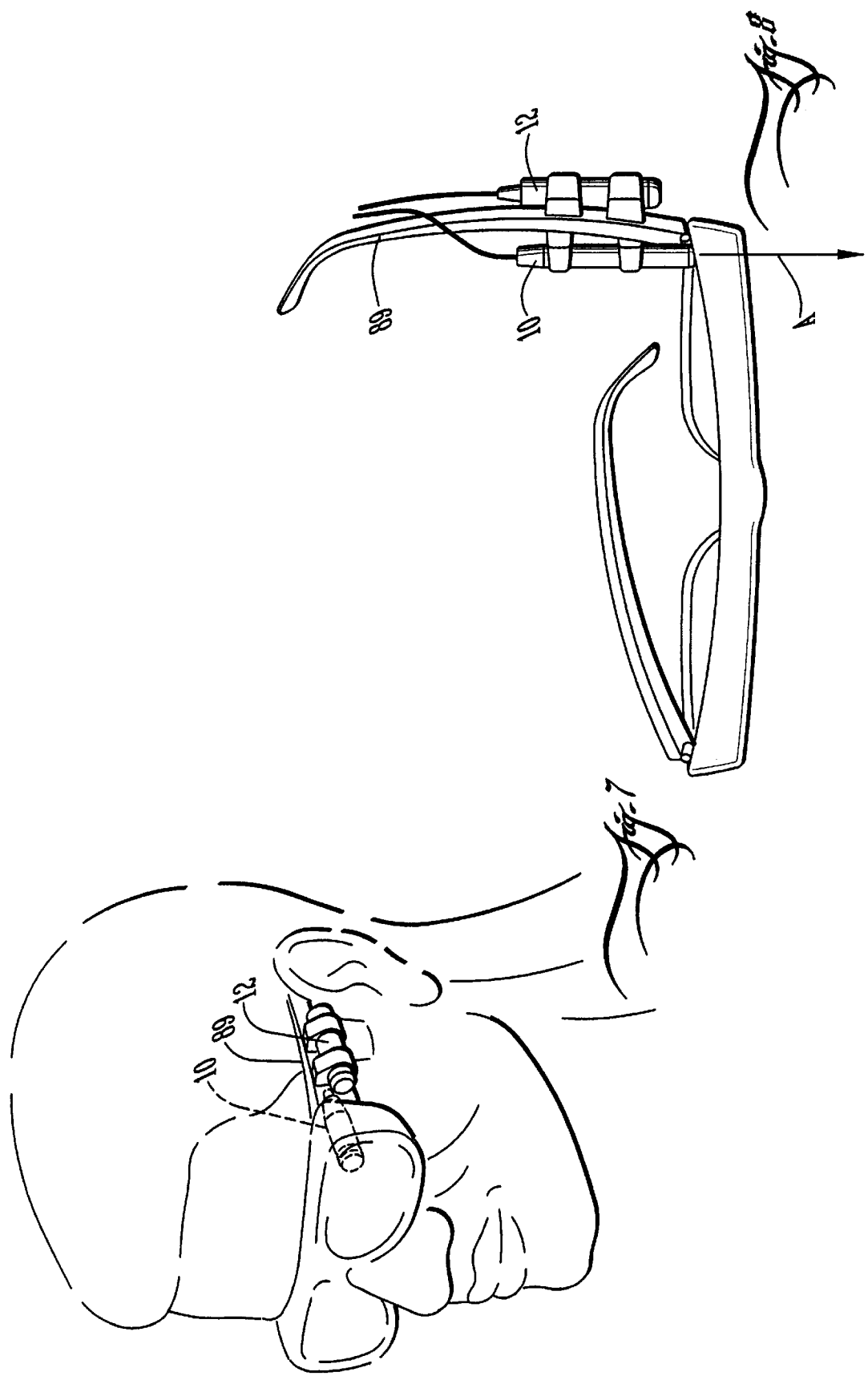

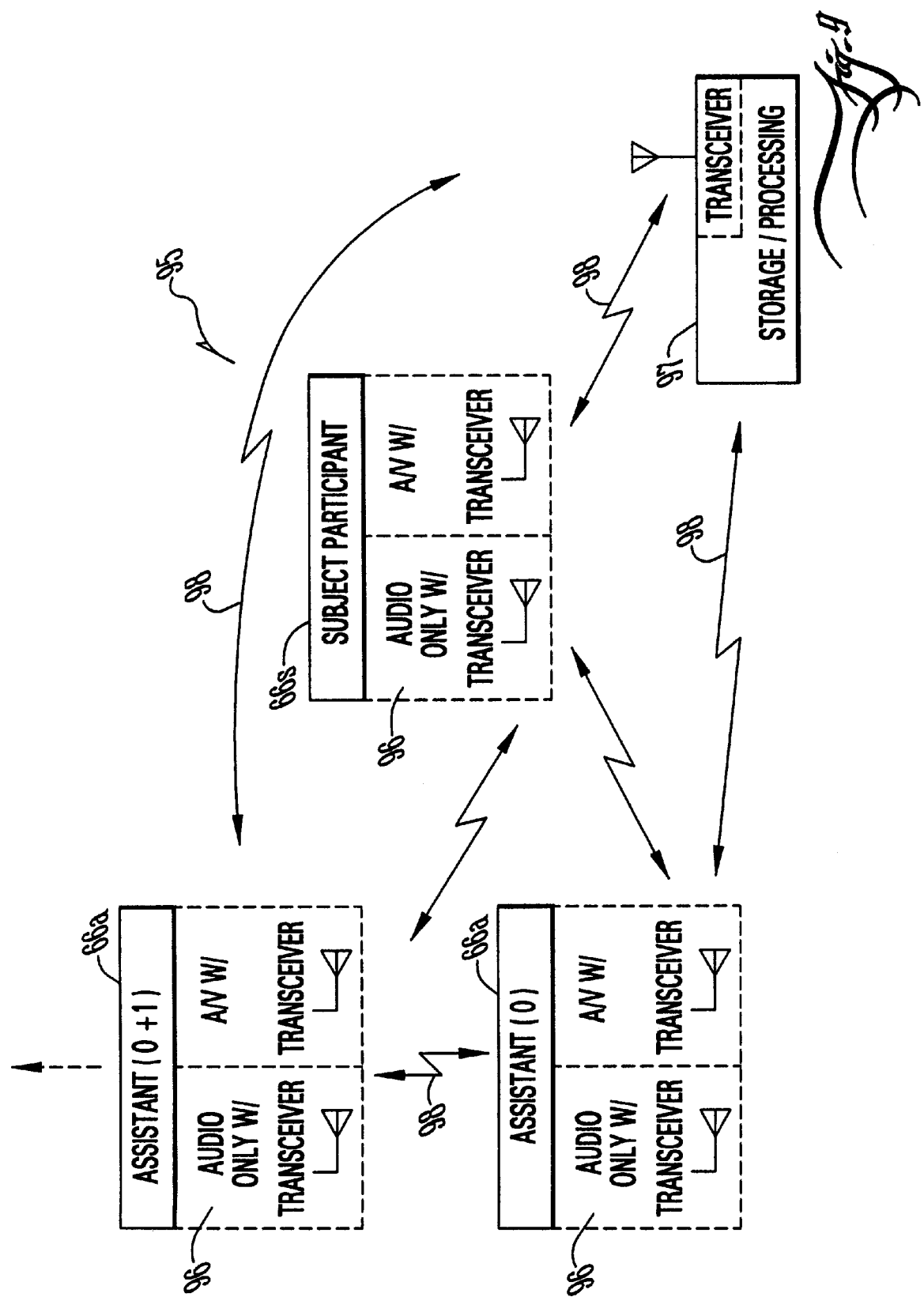

MICRO VIDEO CAMERA USAGE AND USAGE MONITORING

CROSS-REFERENCE TO PROVISIONAL APPLICATION(S)

This application claims the benefit of U.S. Provisional Application No. 60/055,745, filed Aug. 15, 1987, and U.S. Provisional Application No. 60/079,967, filed Mar. 30, 1997.

BACKGROUND AND SUMMARY OF THE INVENTION

1. Field of the Invention

The invention relates to recording a video signal in connection with personal activities such as sports activities including skiing, kayaking, sailing and so on, as well as non-sport activities like archeological field research, crime investigation, and the like. The invention includes adaptations for structuring a rental market for servicing activityparticipants who wish a record of a given activity but do not own a unit in accordance with the invention.

A miniature video camera mounted, for example, on a skier's helmet, is coupled to a backpack-carried transmitter that communicates with a base station having video recording facilities. The base station includes monitoring features and can operate a time and billing database. Optionally the base station includes capabilities to determine whether units that are not officially rented are in use, determine unit and users locations by GPS signaling, and monitor for a "Lojack" type signal indicative if a unit has been removed without authorization. The portable units optionally are waterproofed and/or include humidity and temperature controls where appropriate in accordance with the use environment.

2. Prior Art

To date, micro video recorder sets are known to service— among other markets—the marketplace of law enforcement and public safety for purposes of incident surveillance, evidence recording, in-vehicle video for moving or stationary vehicles including police cruisers and/or helicopters. These have been termed "video incident" recorder sets by the industry. Video incident recorders are available with much variety among various products. Of interest here, however, are the micro products utilizing digital signal processing (DSP) technology and the camera format of charge-coupled devices (CCD). An example DSP CCD micro camera includes one that is available from Panasonic, model no. GP-US502. It is advertised along with other competitive devices, from Sony and others, in the "1997 Optics and Optical Instrument Catalog" of Edmund Scientific Company (of Barrington, N.J.).

The above Panasonic DSP CCD micro camera (i.e., model no. GP-US502) has a micro head or lens module and a remote base control module. The head module contains the CCD lens, and measures about 1.31 inches×1.75 inches×2 inches (3.33 cm×4.45 cm 5.08 cm). Given these measurements, this head module is compact. It displaces about 4.6 cubic inches in volume (75 cc). For comparison, two such modules could insert into a six ounce coffee cup with room to spare. The data signal produced by the head module is carried by cable to the base control module. It too is relatively compact, measuring 5.1 inches×1.75 inches× 9.50 inches (13.0 cm×4.45 cm×24.1 cm), or about comparable in size to a paperback novel. There are even more compact micro cameras on the market, including the CCD micro camera heads of Elmo Manufacturing Corporation (of New Hyde Park, N.Y.), series no. MN421E.

Also interesting are the highly-compact DC-operated video cassette or tape recorders (VCR's or VTR's, respectively, or else, generically, VR's) available from Panasonic under model nos. AG-750 and AG-720 (e.g., video cassette format), or from Sony under model no. EVO-220 (interchangeable between an 8 mm tape and a HI8™ format). These combine compactness with portability due to the facility to power by battery.

A complete video incident recorder system would include an adaptor or controller like a Sony model no. PGV-220 "incident recording adaptor," for mating to the previouslymentioned Sony EVO-220 video recorder. The controller controls the recorder's functions. For example, there is alarm recording:—e.g., a retailer concerned with inventory shrinkage can connect an alarm contact to the controller which responds by recording the alarm condition for durations or 10, 20 or 30 seconds, or 1, 2, 3, 5, or 10 minutes or until the end of the tape. The controller also facilitates quasi time elapse video record-and-sample activity by recording at intervals of 15, 30 and 60 minutes for durations of 10, 20, or 30 seconds, or 1, 2, 3, 5, or 10 minutes. Alternatively, it can also be used for continuous recording of a daily routine, say for example, from 8:30 a.m. to 9:30 a.m. Monday through Friday. And the foregoing functions can be mixed and matched as desired. Common accessories for the above outfits include miniature monitors and battery packs and so on. An example monitor is Sony's model no. AG-LC35P 3.2 inch (8 cm) color LCD monitor.

The foregoing video incident recorder packages have proven popular in the law enforcement and public safety marketplaces. They have not to date appeared to the extent that they might in the amusement or recreational and competition/training marketplaces because of several shortcomings. One shortcoming involves high cost. These systems cost beyond what most persons budget for such an amusement device. And, heat- and shock-resistance aside, another shortcoming involves their lack of weatherresistance for extremely cold or wet environments. What is needed is an improvement which overcomes these and other shortcomings of the prior art.

SUMMARY OF THE INVENTION

It is an object of the invention to provide a portable micro video recorder set that provides solutions to the prior art devices' technological shortcomings which have detracted from their widespread use in the amusement marketplaces.

It is an alternative object of the invention to provide a portable micro video recorder set that provides solutions to the prior art devices' economic shortcomings which have detracted from their economic viability in the amusement marketplaces.

These and other aspects and objects of the invention are provided by a portable micro video recorder set which is sufficiently portable, miniature and weather-resistant for use by a vacationer or athlete (among others) who wishes to wear it (or attach it to a base support structure about his or her person) and self-record his or her own amusement—i.e., recreational or competition or training activity—regardless if indoors or outdoors, underwater or otherwise. Example users and activities in accordance with the invention include without limitation a skier self-recording his own skiing activity, or a kayaker self-recording her own kayaking activity, and snorkelers and cyclists and so on as will be addressed again further below.

An alternative aspect of the invention involves that the portable micro video recorder set is viable for rental distribution such that the user/operator need not own the equipment but simply rent it for the duration of the given activity he or she wishes to record. Another aspect of the invention involves a rental-inventory control, allocation and accounting data handling system.

An alternative usage configuration of micro camera set in accordance with the invention includes a theme park configuration where at most rides or attractions, a set in accordance with the invention is available for loan to a participant so long as the participant rides the ride or whatever. Preferably the theme park has a center where it distributes a storage medium to each interested participant. Representative storage media include tapes and/or diskettes for analog and/or digital storage as appropriate. Hence, a participant arrives at a ride with his or her diskette in hand, inserts it into a (e.g.) goggle-mounted set in accordance with the invention, and rides the ride while concurrently recording the activity. At the end of the ride, the participant retrieves his or her diskette, leaves behind the video recording set in accordance with invention, and proceeds to another ride or attraction where another video recording set awaits for further recordation of the day's activities. Optionally, at the end of the day, the participant returns to the theme park center where the diskette is processed. Ultimately, the participant gets a personal copy of what he or she recorded that day suitable for playback at home.

Another usage configuration of micro camera set in accordance with the invention includes where a subject participant—say for example a training skier—is accompanied on a trial run by one or more assistants or coaches. The participant and coaches can be outfitted such that at least one of them is carrying a video recorder set in accordance with the invention, the others being given (e.g.) two-way radio transceivers. There is also provided a signal storage/processing center which collects all the foregoing audio and video transmission and stores them in a single record where, upon playback, everyone's commentary is synchronized with the video signal so that the commentary correlates with the action for amusement and/or teaching analysis. It is optional whether the storage/processing center is stationary or portable as carried by one of the participant or assistant (s).

Additional aspects and objects of the invention are given more particular discussion as follows.

One aspect of the invention relates to a method of sharing rental inventory of micro video camera recorder sets among a network of affiliates who provide rental services of the micro video camera recorder sets to the end-users thereof. This method includes perhaps some of the following steps.

A global inventory of a rental resource comprising a multiplicity of micro video camera recorder sets is established. A network of affiliates is established who provide rental services of the micro video camera recorder sets to the end-users thereof who rent from the network affiliates. Preferably the composition of the network affiliates is structured such that various ones of the network affiliates have fluctuating busy and slack seasons which don't all coincide among another. A network supervisor is provided and the network supervisor is given resource-sharing authority over the global inventory of micro video camera recorder sets. Each network affiliate is allocated an adjustable local inventory of the micro video camera recorder sets, each one of the local inventories being drawn from the global inventory, wherein each one of the local inventories may range from all to none of the micro video camera recorder sets. A data stream is generated on each network affiliate which includes data on at least one of historic values of actual rental activity or projected values of prospective rental activity. There is a sharing of the global inventory among the network affiliates which is based on findings by the network supervisor given the data stream, such that, under the resource-sharing authority of the network supervisor, micro video camera recorder sets are transferable among the network affiliates in periodic adjustment of any given network affiliate's local inventory.

The step of structuring the composition of the network affiliates further comprises selecting network affiliates based on non-coinciding busy seasons such as network affiliates who service diverse end-users as chosen from among snow skiers, water skiers, jet skiers, kayakers, river rafters, surfers, wind-surfers, skin divers, scuba divers, sky divers, hang-glider pilots, and cyclists.

Generally, the micro video camera recorder sets are of the type having micro video camera heads, and these preferably are encased inside waterproof cases, including providing means for controlling the humidity inside the waterproof cases to prevent fogging. Another preferable option includes providing at least one of the micro video camera heads or the control packs therefor with anti-loss tracking means for tracking lost or stolen inventory.

Hands-free operation is achieved for the micro video camera heads by providing mounting means for mounting the micro video camera heads to a goggle or helmet worn by the end-user. For the control packs, there is provided a portable carrying means for wearing by the end-user for portably carrying the control pack therein and thereby further allowing hands-free operation. The portable carrying means possibly includes batteries.

Generating the data stream is achieved perhaps in part by accounting processing and memory circuits for configuring in the micro video camera recorder sets. These circuits generate and store in memory a history of at least one accounting parameter which can be downloaded in the format of the data stream for later evaluation. The at least one accounting parameter can be a history of recording-function time of the micro video camera recorder set. In other part, the generated data stream can comprise reports of revenue and usage activity by the network affiliates. The data of the at least one accounting parameter in the memory of the accounting processing and memory circuit allows discrepancy audits with the reports prepared by the network affiliates.

An alternative aspect of the invention relates to a method by which theme park visitors can acquire a video record of plural activities at a theme park. This method includes perhaps some of the following steps.

A participating theme park visitor is provided a portable video storage medium for personal use thereby. There are established a plurality of video-enabled stations in the theme park and each is supplied with a local inventory of micro video camera recorder sets. The method allows the participating theme park visitor while visiting a given station chosen from among the plurality of video-enabled stations, optional use of a given micro video camera recorder set chosen from the local inventory. The participating theme park visitor acquires a video record of his or her visit to the given station by means including operatively coupling the video storage medium with the given micro video camera recorder set. After he or she has completed the video record of that visit to the given station by means including the participating theme park visitor retrieving the video storage medium from the given micro video camera recorder set, he or she can thereafter personally carry the video storage medium around elsewhere for optional use at a visit to any other video-enabled station to allow addition to the video storage medium a video record of such visit to such other video-enabled station.

The step of establishing video-enabled stations includes in some instances providing stations such as rides or in other instances stations comprising attractions having any of the following attractions underway: eg., performers, costumed characters, performing or exhibited animals, displays, crafts and crafts-persons and the like.

The video storage medium comprises can be any of cassettes, tapes, or diskettes. The micro video camera recorder sets have at least a micro video camera head, and the step of acquiring a video record includes for at least some of the video-enabled stations, providing mounting means for mounting the micro video camera head to a helmet or goggle to allow hands-free recording.

An embellishment to the basic method for the theme park visitor includes establishing at least one processing center for processing the cumulative video record on any used video storage medium and offering to the participating theme park visitor the choices of at least editing, generating stills, overlaying musical soundtracks, or overlaying special effects on the raw record.

Another aspect of the invention relates to a method of configuring a micro video camera recorder set whereby a plurality of participants in an activity can acquire a record that synchronizes a single video signal with plural audio signals. The method comprises perhaps the following steps.

One of the participants is denominated as the "subject" participant and the remaining ones of the plurality of participants as "assistant" participants. A micro video camera head is adorned by any one of the plurality of participants, wherein the micro video camera head is operative to generate a video signal. Audio transceivers are adorned by everybody: ie., each of the plurality of participants. Wherein the audio transceivers are operative to generate audio signals and enable two-way communication among the plurality of participants. There is also a signal processing and storage means for signal processing and storage. It does so in a record format in which the single video signal is synchronized with the plural audio signals. Moreover, there is also a signal linking means for linking the signal processing and storage means with the signals generated by the audio transceivers and micro camera head.

Preferably there is provided a mounting means for mounting the micro video camera head to a goggle or helmet worn by the camera-head adorned participant to allow hands-free operation. If the camera-head adorned participant is chosen from one of the assistants, this allows acquiring a record of the subject participant's participation in the activity. On the other hand, if the camera-head adorned participant is the subject participant, this allows acquiring a record of the subject participant's perspective of the activity. Likewise for hands-free operation, the signal processing and storage means are combined for portability together. Thus hey can be carried in a portable carrying means for wearing by any one of the plurality of participants for portably carrying the signal processing and storage means therein and thereby allowing hands-free operation. It is possible that the portable carrying means includes batteries. It is also possible that the signal linking means includes radio communication.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a portable micro video recorder set in accordance with the invention, as shown worn by a skier and allowing him to self-record his skiing activity to illustrate an example, operative use environment for the invention;

FIG. 2 is a perspective view comparable to FIG. 1 except showing usage by a kayaker to illustrate another example, operative use environment for the invention;

FIG. 3 is a diagrammatic view of a portable micro video recorder set in accordance with the invention, including various options therefor;

FIG. 4 is a diagrammatic view of a rental-market affiliate network to illustrate the structure thereof;

FIG. 5 is a diagrammatic view of the exchange between the network supervisor and a given network affiliate, of the rental inventory and accounting data that is tracked by a rental-inventory control, allocation, and accounting data handling system in accordance with the invention;

FIG. 6 is a diagrammatic view of an alternate usage configuration in accordance with the invention for the micro video cameras in accordance with the invention, as shown structured for a theme park to illustrate one operative use environment therefor;

FIG. 7 is a perspective view of a goggle-mounting arrangement in accordance with the invention for a user of the micro video camera in accordance with the invention;

FIG. 8 is a plan view thereof;

FIG. 9 is a diagrammatic view of another usage configuration in accordance with the invention for the micro video cameras in accordance with the invention, as shown structured for more than one individual wherein one individual is presumed to be the principle subject of the record and the remainder are presumed to be assistant(s).

DETAILED DESCRIPTION OF THE PREFERRED EMBODIMENTS

In FIG. 1, a portable micro video recorder set 10 in accordance with the invention is shown worn by a skier to illustrate an example, operative use environment for the invention. The video recorder set 10 allows the skier to self-record his skiing activity.

The video recorder set 10 includes a CCD camera head 12 attached to a head band worn around the skier's head. The CCD camera head 12 could alternatively be attached to ski goggles, a helmet, or mounted in the middle of the skier's chest (the ski goggle-mounting option is more particularly shown and described hereinafter in connection with FIG. 7 and 8). The CCD camera head 12 of course is effectively the lens for the video recorder set 10. The video recorder 10 set further includes a CCD control pack 14 and a video recorder pack 16 worn on a belt (hidden from view by the ski jacket) on the skier's opposite hips. The operative components of the CCD control pack 14 and video recorder pack 16 are DC-operated and are powered by a battery pack also hung from the belt (which battery pack is not in view, it being located rear on the skier, but is referenced as numeral 18 in FIG. 3). Alternatively, the skier could wear a backpack (not shown) to carry the CCD control, video recorder battery packs 14, 16 and 18.

The skier also wears a wrist band to which is attached an LED indicator 24 to give a visual indication of the recording function of the video recorder 16'. A microphone or audio pick-up is affixed to the CCD control pack 14 to provide a corresponding audio track for the recorder 16' (which audio pick-up is not in view, but is referenced as numeral 26 in FIG. 3).

FIG. 2 shows a comparable, portable micro video recorder set 10 in accordance with the invention, as worn in this view by a kayaker to illustrate another example, operative use environment for the invention. The video recorder set 10 allows the kayaker to self-record her kayaking activity. The CCD camera head 12 is comparably attached to a head band worn around her head. Again it could alternatively be attached to goggles or a helmet, or mounted in the middle of her chest (none of these options are shown). Alternatively, the CCD camera head 12 could be mounted to the deck of the kayak in a position in front of the kayaker, as shown in dashed lines. It is also an option that the CCD camera head 12 could be mounted to a goose neck carrier having a base origin on the rear deck of the kayak, for holding the CCD camera head at a position behind and above the kayaker's shoulders. Although this is not shown, a suitably adjustable goose neck device which includes a sufficient locking mechanism to hold it rigid is disclosed in U.S. Pat. No. 5,564,667—Copeland et al., the disclosure of which is incorporated herein by this reference to it.

The CCD control pack 14 and the video recorder pack 16 are worn on straps across the kayaker's torso. The battery pack 18 (not in view, but see FIG. 3) is stowed below deck. In fact, the CCD control pack 14 and the video recorder pack 16 could likewise be stowed below deck. The recording function of the video recorder 16' is indicated to the kayaker via the LED 24 worn on the wristband.

Whereas the drawings illustrate use of the invention in connection with skiing and kayaking, this is done so merely for convenience in this description as the use of the invention is widely applicable to various amusement activities regardless if the user is merely enjoying a recreational activity or else is training for competition or actively participating in competition. Other example amusement activities include without limitation river rafting and canoeing, water skiing, jet skiing and para-sailing, wind-surfing and catamaran sailing, snorkeling and scuba diving, cycling and frisbee, hang gliding and sky diving, and so on. The mounting of the CCD camera head 12 is adaptable such that, for instance, a cyclist might prefer the CCD camera head 12 be mounted to his or her helmet, while on a catamaran it might be attached to the mast. On a hang glider it might be attached to the frame while a snorkeler might prefer it mounted on or within his or her mask. The mounting of the CCD camera head 12 can be readily changed such that during a given amusement activity the user can move the CCD camera head 12 about to different mounting places to get different perspectives of the activity.

FIG. 3 is a diagrammatic view of a portable micro video recorder set 10 in accordance with the invention, and this view includes various options for alternative arrangements of the video recorder set 10. The CCD camera head 12 could comprise a commercially available model such as, for instance, the above-mentioned Elmo Manufacturing Corporation's models, serial no. MN421E. Whereas generally the commercially available units are only moderately heat- and shock-resistant, they would have to be sufficiently water-proofed inside water-tight cases with silica for humidity control. The CCD camera head 12 communicates with the CCD control pack 14 via a cable 28 which also sufficiently withstands submersion and cold.

The CCD control pack 14 includes a commercially available CCD control module 14' which is compatible with the CCD camera head 12 and can be chosen from the products referenced previously. It is an aspect of the invention the CCD control pack 14 incorporates an accounting processing and memory module or circuit 30. This circuit 30 comprises suitable CPU, memory and I/O chips and can be routinely constructed and programmed by an ordinarily-skilled software consultant. The logging functions of this circuit 30 and the access (via a plug-in socket 34) and use of its logged data will be described more particularly below.

The CCD control module 14' processes or converts the digital format signal of the CCD camera head 12 into a video-recorder formatted signal for communication to the video recorder pack 16. The video recorder pack 16 can include a commercially available video recorder module or unit 16' chosen from among the video recorder products referenced previously. Alternatively, there is a wide variety of signal storage options ranging from analog storage on a tape media such as a video cassette, or storage in digital format as on a diskette (and as shown and described more particularly hereinafter in connection with FIG. 6), and so on.

Each of the CCD control pack 14 and the video recorder pack 16 includes an optional anti-loss tracking device 36. Such devices are commonly used in automobiles for anti-theft tracking purposes and incorporate global-positioning satellite technology to track a lost or stolen device or automobile. Example producers and service providers of such anti-loss/anti-theft tracking systems include Corp Ten International of Baltimore, Md., or TRAK Software, Inc. (e.g., "Lo-jack" type signals indicative of whether a unit/set has been removed without authorization). Whereas these tracking devices and the attendant service agreements are relatively costly, they are preferred for incorporation in the invention given the comparable costliness of the CCD control and video recorder packs 14 and 16. The tracking devices 36 have their own internal batteries (not illustrated) which are trickle charged by connection to the power bus 38.

Additionally, each of the CCD control pack 14 and the video recorder pack 16 can optionally include transceivers 42 as are known in the cordless telephone industry and as are disclosed by, for instance, U.S. Pat. No. 5,231,657—Umemoto et al., the disclosure of which is incorporated herein by this reference to it. By incorporating transceivers 42 into the CCD control and video recorder packs 14 and 16, respectively, allows signal communication via a wireless communication path 44. The user can leave the video recorder pack 16 at a base station and merely carry the CCD control pack 14 on his or her person (this is not illustrated). Whereas the drawing also shows intercommunication by cable 46, it is within the ordinary skills of an electronics technician to outfit the CCD control and video recorder packs 14 and 16 with transceivers 42. Despite the option of leaving the video recorder pack at a base station, the user shall still have to carry a power supply or battery pack 18 for the CCD control pack 14. The battery pack 18 can also be used to power the video recorder pack 16 if carried with the user. If on the other hand, the video recorder pack 16 is left behind at a base station, then it shall require its own power supply such as a separate battery pack 18' or else connection to a car battery by adaptor (not shown) or alternatively to a public utility socket (also not shown) via a conventional AC adaptor or the like. Example battery packs include without limitation the Sony series nos. NP 60D/80/80D. An example car battery adaptor includes Sony model no. DP-77(1), and an example AC adaptor includes Sony model no. AC-S10.

A further option includes provision of a monitor 50 for audio-video playback of the recorded amusement activity. The monitor 50 can be chosen from the product(s) referenced previously. Waterproofing the hardware involves packaging the CCD camera head 12 inside a sealed tube 54 or the like, and packing the CCD control, video recorder and battery packs 14, 16 and 18 in neoprene liners 56 or the like. When properly waterproofed, the video recorder set 10 in accordance with the invention will survive use in underwater environments as is desired by snorkelers and scuba divers and even kayakers and water skiers and so on.

FIG. 4 is a diagrammatic view of a rental-market structure (or network) among a network supervisor 60 and multiple network affiliates 64. In this structure, the video camera recorder set 10 in accordance with the invention is an article of inventory. As such, it is owned by the network supervisor 60 and loaned as inventory to a given network affiliate 64 for that affiliate 64 to rent to the end user(s) 66 of the video recorder set(s) 10. For instance, the network supervisor 60 is likely to loan out multiple video recorder sets 10 to a ski shop network affiliate 64 during a winter season. In turn, that ski shop network affiliate 64 conducts normal business with its customers 66, renting out the video recording sets 10 to the users/skiers 66 so that the skiers 66 can self-record their own skiing activity.

The end of the skiing season generally corresponds with the onset of the warm-water sports season. Accordingly, the network supervisor 60 can determine to reallocate much of the inventory presently at the ski shop network affiliate 64 over to water sports shop network affiliate 64. Hence during the warm water sports season, the water sports shop network affiliate 64 has sufficient inventory on hand to service its customers who are likely to be kayakers 66 (as indicated) or are just as likely to be river rafters, canoers, water skiers, jet skiers, wind-surfers, snorkelers and scuba divers and so on. Other warm weather sports include cycling and hang gliding and so on. By allocation and transferring inventory around among a network of affiliates 64, the network supervisor 60 can achieve a higher yield of actual rentals of a given video recorder set 10 rather than allow it lie unused in an alpine ski shop during the off (if not closed) season.

FIG. 5 is a diagrammatic view of the exchange—between the network supervisor 60 and a given network affiliate 64—of the rental inventory 68 and accounting data 70 that is tracked by a rental-inventory control, allocation, and accounting data handling system 80 in accordance with the invention. The rental-inventory control, allocation, and accounting data handling system 80 in accordance with the invention comprises a central data handling server 84 whose reports are accessible to the network supervisor 60. It also comprises the revenue and usage (or rental activity) reports 86 generated by the network affiliate 64 for receipt by the network supervisor 60, and it further includes the accounting processing and memory modules or circuits 30 incorporated (preferably) in the CCD control pack 14 as shown by FIG. 3, although these module/circuits 30 could be incorporated elsewhere including for example in the video recorder pack 16 (not shown).

With further reference to FIG. 5, it is a business-motivated desire of the network supervisor 60 to collect and organize the appropriate information about the rental activity of a given network affiliate 64 to allow the network supervisor 60 to determine the number of video recorder sets 10 which that given affiliate is loaned to inventory 68 to allow it to service its customers 66 during the season. There are plural sources for that rental activity information. One source is directly from the network affiliate in the form of its revenue and usage reports 86. If the reports 86 are sufficiently detailed, they shall include such matters as billable usage, billed usage, collections and credits, usage by date (e.g., day of week) and time of day (or the like), occurrences of insufficient inventory 68 to meet demand, and so on. However, realistically, it may be impracticable for the network supervisor 60 to ask the affiliate 64 to attend to and complete such exhaustive reports that cover all the above matters. Therefore, it is an aspect of the invention that the accounting and processing circuit 30 (FIG. 3) embedded in each CCD control pack 14 logs recording-function time or the like against calendar time by hour(s) and minute(s) or something comparable, and stores such logged data in memory 30 for later access. Given the foregoing, a network supervisor 60 can obtain audits 88 with auditors reading the memory contents of the accounting processing and memory circuits 30, primarily in order to gather more complete picture of the health of the rental business of that affiliate 64. The audits 88 also provide another benefit. The audits 88 allow discrepancy checks between the revenue and usage reports 86 prepared by the affiliate, and the machine logged data of the accounting processing and memory circuits 30.

These aspects of the invention relating to a rental-inventory control, allocation, and accounting data handling system 80 allow the network supervisor 60 to optimize the distribution of rental inventory 68 among its affiliates 64 for increased cost effectiveness. A ski shop is loaned inventory for winter but not summer so inventory does not sit idle during summer when it might be more profitably loaned to a water sports shop, and vice versa Such a system 80 enables servicing a given segment of the amusement market with an optimally minimum number of video recorder sets 10, which corresponds to a reduced capital investment or liability by the network supervisor 60 than otherwise. The network supervisor 60 can achieve sufficient yields on relatively lower margins because it of course has less of a capital liability than otherwise. Thus the rental-inventory control, allocation, and accounting data handling system 80 in accordance with the invention provides retail end-users 66 with lower charges and gives the network supervisor 60 comparable competitive advantages for the benefits of its affiliates 64.

FIG. 6 is a diagrammatic view of an alternate usage configuration 90 in accordance with the invention for the micro video cameras in accordance with the invention. In the example illustrated in FIG. 6, the alternative usage configuration 90 is structured for a theme park to illustrate one operative use environment therefor.

In FIG. 6, the alternative usage configuration 90 comprises a theme park configuration where at most rides 91 or attractions 92, a set 10 in accordance with the invention is available for loan to a participant so long as the participant rides the ride 90 or views the attraction 91 or whatever. Preferably the theme park 90 has a center 93 where a storage medium 94 is distributed to each interested participant 66. Representative storage media include tapes and/or diskettes for analog and/or digital storage as appropriate.

Hence, a participant 66 arrives at the theme park 90 and at the diskette-distribution center 93, which may be the main gate for the park 90, he or she obtains a diskette 94 for use all day. A path 66' is shown wherein a given participant 66' rides an original ride $91^o$, and then a successive ride $91_{o+1}$, and so on, and completes his or her day viewing attraction 92$^{n-1}$ and 92$^n$, before departure through the gate 93. At each ride 91 or attraction 92, the participant arrives with his or her diskette 94, is given a video-recorder set 10 from among the local inventory 68 there at that ride 91 or attraction 92, inserts it into a (e.g.) goggle-mounted set in accordance with the invention (for an example of this, see FIGS. 7 and 8), and rides the ride 91 or tours the attraction 92 while concurrently recording the activity. At the end of the ride 91 or activity 92, the participant 66' retrieves his or her diskette 94, leaves behind the video recording 10 with the local inventory 68, and proceeds to another ride 91 or attraction 92 where another inventory 68 of video recording sets 10 awaits for further loan out recordation of the day's activities. At the end of the day, the participant 66' returns to the theme park gate/diskette-processing center 93 where the diskette 94 is processed. Processing can include editing, overlaying musical soundtracks and/or special effects, generating stills, and so on. Ultimately, the participant 66' gets a personal copy of what he or she recorded that day suitable for playback at home.

FIG. 7 is a perspective view of a goggle-mounting arrangement 89 in accordance with the invention. FIG. 8 is a plan view thereof. The goggle-mounting arrangement 89 includes a camera head 12 mounted for viewing through the lens all objects extending along an axis A that is parallel to the participant's line of vision. The goggle-mounting arrangement optionally includes the control module 14 attached to the outside of the ear piece.

FIG. 9 is a diagrammatic view of another usage configuration 95 in accordance with the invention for the micro video cameras 10 in accordance with the invention. This other usage configuration 95 is shown structured for usage by a party of two or more, wherein one individual 66s is presumed to be the principle subject of the record with the remainder being presumed to be assistant(s) 66a. To give a non-limiting real life example, it can presumed that the "subject" participant 66s is a skier undergoing training as attended by one or more "assistants" 66a who might be coaches, and who are presumed also skiing as alongside the "subject" skier 66s to observe and provide instruction. In one version of this configuration 95 the "subject" skier 66s might wear the video camera set 10 whereas the assistants 66a only get two-way radios 96. By another version, one of the assistants 66a can ski carrying the video camera set 10 while the "subject" skier 66s and the other assistant get two-way radios 96 only. By the one way the video record is taken from the perspective of the "subject" skier 66s, and by the other way the video record is taken from the perspective of the assistant 66a skiing with the camera set. These various versions are indicated by dashed line blocks appended to the solid line blocks of the "subject" skier 66s and assistants 66a.

In any case, it is preferred if everyone of the party 66s and 66a is given a two-way radio so that everyone may speak during the activity with comments or questions or instructions and so on, as would facilitate training. This is accomplished in the standard way with two-way radios by transceivers as shown.

There is also provided a signal storage/processing center 97 which collects all the foregoing audio and video transmissions 98 for storage in single record where, upon playback, the commentary of everyone in the party 66s and 66a is synchronized with the video signal. That way, the commentary correlates with the action for amusement and/or analysis later, long after completion of the activity, repetitively as needed. It is optional whether the storage/processing center 97 is stationary, or portable, and if portable then presumptively it will be backpack-carried by someone in the party 66s or 66a.

Using a wide angle lens picks up a lot more scenery for the video record. Skiers on vacation are presumed to want to show others what the resort was like when they get home. Another lens which makes tighter shots possible would be preferred by instructors wanting to point out good points and mistakes to students.

Whereas the foregoing units/sets 10 in accordance with the invention are suitable for servicing rental markets, it is also intended that they be available for retail and so any of the foregoing description relating to rental markets is included as one non-exclusive example usage of the invention, but is not strictly limiting.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of sharing rental inventory of micro video camera recorder sets among a network of affiliates who provide rental services of the micro video camera recorder sets to the end-users thereof, comprising the steps of:

providing a global inventory of a rental resource comprising a multiplicity of micro video camera recorder sets;

providing a plurality of network affiliates who provide rental services of the micro video camera recorder sets to the end-users thereof who rent from the network affiliates;

structuring the composition of the network affiliates such that various ones of the network affiliates have fluctuating busy and slack seasons which don't all coincide among another;

providing a network supervisor and giving the network supervisor resource-sharing authority over the global inventory of micro video camera recorder sets;

allocating each network affiliate an adjustable local inventory of the micro video camera recorder sets, each which local inventory is drawn from the global inventory and each which local inventory may range from all to none of the micro video camera recorder sets;

generating a data stream on each network affiliate including at least one of historic values of actual rental activity and projected values of prospective rental activity;

sharing the global inventory among the network affiliates based on findings by the network supervisor given the data stream, such that, under the resource-sharing authority of the network supervisor, micro video camera recorder sets are transferable among the network affiliates in periodic adjustment of any given network affiliate's local inventory.

2. The method of claim 1 wherein the step of structuring the composition of the network affiliates further comprises selecting network affiliates based on non-coinciding busy seasons such as network affiliates who service diverse end-users as chosen from among snow skiers, water skiers, jet skiers, kayakers, river rafters, surfers, wind-surfers, skin divers, scuba divers, sky divers, hang-glider pilots, and cyclists.

3. The method of claim 1 wherein the step of providing a global inventory of a rental resource comprising a multiplicity of micro video camera recorder sets further comprises:

providing micro video camera recorder sets of the type having micro video camera heads; and, providing waterproof cases for the micro video camera heads, including means for controlling the humidity inside the waterproof cases to prevent fogging.

4. The method of claim 1 wherein the step of providing a global inventory of a rental resource comprising a multiplicity of micro video camera recorder sets further comprises:

providing micro video camera recorder sets of the type having micro video camera heads and control packs; and, providing at least one of the micro video camera heads and the control packs with anti-loss tracking means for tracking lost or stolen inventory.

5. The method of claim 1 wherein the step of providing a global inventory of a rental resource comprising a multiplicity of micro video camera recorder sets further comprises:

providing micro video camera recorder sets of the type having micro video camera heads; and, providing mounting means for mounting the micro video camera heads to a goggle or helmet worn by the end-user to allow hands-free operation.

6. The method of claim 5 wherein the step of providing micro video camera recorder sets further comprises:

providing micro video camera recorder sets of the type including control packs; and, providing portable carrying means for wearing by the end-user for portably carrying the control pack therein and thereby further allowing hands-free operation, the portable carrying means including batteries.

7. The method of claim 1 wherein the step of generating a data stream further comprises:

providing accounting processing and memory circuits for configuring in the micro video camera recorder sets generating and storing in memory a history of at least one accounting parameter which can be downloaded in the format of said data stream.

8. The method of claim 7 wherein said at least one accounting parameter comprises a history of recording-function time of the micro video camera recorder set.

9. The method of claim 7 wherein the step of generating a data stream further comprises:

reporting revenue and usage activity by the network affiliates, wherein the data of the at least one accounting parameter in the memory of the accounting processing and memory circuit allows discrepancy auditing.

10. A method by which theme park visitors can acquire a video record of plural activities at a theme park, comprising the steps of:

providing a portable video storage medium to any participating theme park visitor for personal use thereby;

providing a plurality of video-enabled stations in the theme park and supplying each video-enabled station with a local inventory of micro video camera recorder sets;

allowing the participating theme park visitor while visiting a given station chosen from among the plurality of video-enabled stations, optional use of a given micro video camera recorder set chosen from the local inventory;

acquiring a video record of the participating theme park visitor's visit to the given station by means including operatively coupling the video storage medium with the given micro video camera recorder set;

completing the video record of that visit to the given station by means including the participating theme park visitor retrieving the video storage medium from the given micro video camera recorder set for personally carrying thereafter for optional use at a visit to any other video-enabled station to allow addition to the video storage medium a video record of such visit to such other video-enabled station.

11. The method of claim 10 wherein the step of providing a plurality of video-enabled stations further comprises providing in some instances stations comprising rides and in other instances stations comprising attractions having any of performers, costumed characters, performing or exhibited animals, displays, crafts and crafts-persons.

12. The method of claim 10 where in the video storage medium comprises one of cassettes, tapes, and diskettes.

13. The method of claim 10 wherein the micro video camera recorder sets comprise at least a micro video camera head, and the step of acquiring a video record includes for at least some of the video-enabled stations, providing mounting means for mounting the micro video camera head to a helmet or goggle to allow hands-free recording.

14. The method of claim 10 further comprising:

providing at least one processing center for processing the cumulative video record on any used video storage medium and offering to the participating theme park visitor at least one of editing, generating stills, overlaying musical soundtracks, and overlaying special effects.

15. A method of configuring a micro video camera recorder set whereby a plurality of participants in an activity can acquire a record that synchronizes a single video signal with plural audio signals, comprising the steps of:

denominating one of the participants as the subject participant and the remaining ones of the plurality of participants as assistant participants;

providing a micro video camera head and adorning any one of the plurality of participants with the micro video camera head, wherein the micro video camera head is operative to generate a video signal;

providing a plurality of audio transceivers and adorning each of the plurality of participants with one of the audio transceivers, wherein the audio transceivers are operative to generate audio signals and enable two-way communication among the plurality of participants;

providing signal processing and storage means for signal processing and storage in a record format in which the single video signal is synchronized with the plural audio signals; and, signal linking means for linking the signal processing and storage means with the signals generated by the audio transceivers and micro camera head.

16. The method of claim 15 further comprising:

providing mounting means for mounting the micro video camera head to a goggle or helmet worn by the camera-head adorned participant to allow hands-free operation.

17. The method of claim 16 wherein the camera-head adorned participant is chosen from one of the assistants to allow acquiring a record of the subject participant's participation in the activity.

18. The method of claim 16 wherein the camera-head adorned participant is the subject participant to allow acquiring a record of the subject participant's perspective of the activity.

19. The method of claim 15 wherein the signal processing and storage means are combined for portability together, further comprising:

provicing portable carrying means for wearing by any one of the plurality of participants for portably carrying the signal processing and storage means therein and thereby allowing hands-free operation, the portable carrying means including batteries.

20. The method of claim 15 wherein the signal linking means includes radio communication.

* * * * *